United States Patent [19]
Landé

[11] Patent Number: 5,829,344
[45] Date of Patent: Nov. 3, 1998

[54] HOME YOGURT/CHEESE MAKING MACHINE

[76] Inventor: Arnold J. Landé, 3209 Snelling Ave., Minneapolis, Minn. 55406

[21] Appl. No.: 872,009

[22] Filed: Jun. 9, 1997

[51] Int. Cl.[6] .......................... A47J 43/044; A23G 9/00; A23G 9/12; B01F 7/20
[52] U.S. Cl. ............................... 99/453; 62/342; 99/348; 99/468; 99/489; 366/146; 366/149; 366/251; 366/601
[58] Field of Search .............................. 99/326–332, 348, 99/452–455, 460, 464, 466, 468, 486, 489; 62/340–343, 68, 258; 219/430, 387, 441, 530; 165/47; 366/64–66, 96–98, 142, 144–146, 149, 241–251, 252, 279, 347, 601; 426/41, 43, 565, 573, 583, 588, 657, 658, 548

[56] References Cited

U.S. PATENT DOCUMENTS

| | | | |
|---|---|---|---|
| 568,769 | 10/1896 | Katz | 62/68 |
| 1,742,878 | 1/1930 | Rosenberg | 366/251 X |
| 2,607,566 | 8/1952 | Saunders | 366/149 X |
| 3,685,153 | 8/1972 | Borkton . | |
| 3,946,657 | 3/1976 | Driessen et al. . | |
| 4,009,368 | 2/1977 | Faivre et al. . | |
| 4,022,914 | 5/1977 | Moody . | |
| 4,066,791 | 1/1978 | Corbin, Jr. . | |
| 4,066,794 | 1/1978 | Schur . | |
| 4,163,472 | 8/1979 | Taylor . | |
| 4,195,561 | 4/1980 | Castanis . | |
| 4,206,244 | 6/1980 | Schenk . | |
| 4,212,236 | 7/1980 | Guillan . | |
| 4,289,788 | 9/1981 | Cajigas . | |
| 4,497,580 | 2/1985 | Doyel | 366/251 X |
| 4,590,077 | 5/1986 | Trop . | |
| 4,624,853 | 11/1986 | Rudin . | |
| 4,664,529 | 5/1987 | Cavalli | 99/455 X |
| 4,696,166 | 9/1987 | Bukoschek et al. | 62/343 X |
| 4,719,113 | 1/1988 | Kharrazi . | |
| 4,737,374 | 4/1988 | Huber et al. . | |
| 4,802,407 | 2/1989 | Negri et al. | 99/453 |
| 4,838,702 | 6/1989 | Torimitsu et al. | 62/342 X |
| 5,013,158 | 5/1991 | Tarlow | 99/348 X |
| 5,031,518 | 7/1991 | Bordes | 366/601 X |
| 5,054,383 | 10/1991 | Cho . | |
| 5,106,199 | 4/1992 | Eckel et al. | 366/147 X |
| 5,145,697 | 9/1992 | Cajigas . | |
| 5,201,263 | 4/1993 | Teng | 99/348 X |
| 5,372,422 | 12/1994 | Dubroy | 99/348 X |
| 5,497,695 | 3/1996 | Canela | 366/249 X |
| 5,516,208 | 5/1996 | Givant | 366/251 |
| 5,549,042 | 8/1996 | Bukoschek et al. | 99/455 |
| 5,676,463 | 10/1997 | Larsen | 366/251 |
| 5,711,602 | 1/1998 | Rohring et al. | 366/251 |

*Primary Examiner*—Timothy F. Simone
*Attorney, Agent, or Firm*—Haugen and Nikolai, P.A.

[57] ABSTRACT

A kitchen appliance for preparing yogurt, soft frozen yogurt and ice cream, hard frozen yogurt and ice cream, and cheese. The appliance includes a container having a generally square open top around the periphery of which are switch actuators or contacts. A square cover having a plurality of vent openings formed therethrough and electrical switch devices positioned about its periphery for cooperation with those on the rim of the container is used to select the mode of operation for accommodating the type of food item being prepared based on which of the four possible ways it can be positioned on the container. A motor-driven paddle device is rotationally journaled with respect to the cover and the motors therefor are adapted to be driven either continuously or with a predetermined duty cycle, dependent upon the product being made. Also mounted on the cover is a vent hole occluder that is normally positioned to block the vent holes, but which shifts to a second position uncovering those vent holes when the consistency of the product being produced, as tested by the paddle motion, increases the resistance to rotation. Shifting of the occluding device from the covering position to the open position also actuates a switch to shut off the drive motor and a heating element.

22 Claims, 3 Drawing Sheets

HOME YOGURT/CHEESE MAKING MACHINE

BACKGROUND OF THE INVENTION

I. Field of the Invention

The present invention relates generally to kitchen appliances, and more particularly to a machine for preparing any one of yogurt, soft frozen yogurt, hard frozen yogurt and cheese, at home.

II. Discussion of the Prior Art

Because of its taste and nutritional value, yogurt has been an increasingly popular food product. Many brand name yogurt products are available to the consumer in supermarkets. Traditionally, and because of the expense of these products, some consumers attempt to make yogurt at home. Warming devices for making yogurt at home are available and are discussed in the prior art. For example, U.S. Pat. No. 4,009,368 to Faivre et al. describes an electrically heated yogurt-making machine having an enclosure containing a receptacle into which milk and a yogurt starter is placed. The enclosure contains an electrical heating element and a fusible material (wax) which is adapted to be heated to a melting point by the heating element. Heat from the melted wax is transferred to the milk container. The purpose of the wax is to provide a thermal mass exhibiting a temperature plateau at or near the optimum for incubating the bacteria used to transform the milk to yogurt.

The yogurt making process requires that the yogurt mix incubate relatively undisturbed for a somewhat unpredictable number of hours until the desired consistency and acidity is achieved. More frequent disturbance results in curdling of the milk product and the formation of cheese. If too high a temperature is employed, it accelerates the process to the point where it is difficult to catch the end-point where consistency and flavor are at their optimum. Traditional, home-based, room temperature yogurt techniques are slow, sometimes taking as long as 12 hours. The room temperature yogurt process does, however, offer the advantage of allowing it to be checked at reasonable intervals so that the incubation process can be terminated at or near its optimal point by initiating cooling. The incubation process can be accelerated to only about four hours by providing a warm environment for the yogurt mix, but if the optimal point is not detected accurately, the yogurt becomes more acidic and less palatable. Thus, considerable operator attention and care is required with prior art warming apparatuses.

The yogurt making appliance of the present invention obviates these problems. Specifically, the yogurt making machine of the present invention requires no operator intervention or monitoring during the reasonably rapid, warmed incubation process. The warming is automatically terminated at the desired point in the process with refrigeration being initiated automatically to terminate further incubation.

A further object and advantage of the present invention is that the same machine can be used to facilitate the preparation of frozen yogurt as well as both cultured and artificially curdled cheese products.

SUMMARY OF THE INVENTION

The yogurt making appliance constructed in accordance with the present invention is particularly adapted for use in the home to make yogurt, hard and soft frozen yogurt or ice cream and cheese products. The appliance includes an insulated container having a flat base and peripheral side walls defining a non-circular cross-section and an open top through which milk or dried milk and water is added to a yogurt starter, usually yogurt from the supermarket or a remnant of a previous batch. One or more of the peripheral side walls, the base or a paddle member have embedded therein or otherwise support an electrical heating element that is adapted to apply heat to the contents of the container. A cover member is configured to fit atop the peripheral side walls in covering relation to the open top of the container. The cover member includes at least one vent hole formed therethrough, along with a centrally located hole that is adapted to receive a paddle support shaft therethrough. The paddle support shaft has a paddle secured to its lower end and the shaft for the paddle is sufficiently long so that with the paddle disposed within the container, the shaft will pass upwardly through the central hole in the cover member. Also disposed about the paddle support shaft and positioned atop the cover member is a means for selectively covering and opening the vent hole(s) in the cover member. The means for selectively occluding and opening the vent hole(s) is releasibly secured to the cover member by magnetic attraction or otherwise, such that a predetermined force must be applied to the vent hole occluding means before it is able to move relative to the cover member. Finally, at least one drive motor is affixed to the vent hole occluding means for normally rotating either the paddle support shaft and paddle relative to a stationary container or, in an alternative configuration, at least one drive motor is affixed to the base for normally rotating the container relative to a stationary paddle and attached vent hole occluding means, to periodically test the liquid contents in the container. Both configurations rotate the occluding means from a vent hole occluding position to an open position upon the thickening of the contents in the non-circular container sufficient to inhibit the relative rotation of the paddle with respect to the container or the container with respect to the paddle with a resistance force that exceeds the predetermined coupling force existing between the occluding means and the cover member.

When preparing yogurt, the machine of the present invention will preferably be placed within the refrigeration compartment of a household refrigerator and with a power cord for energizing the motor and the heating element extending out of the refrigerator past the soft gasket surrounding the door to a wall outlet. A timer is included as a part of the appliance for periodically energizing the motor(s) with a predetermined duty cycle whereby at relatively long periodic intervals, e.g., about every 15 minutes, the motor is energized for a relatively short time interval, e.g., about five seconds. This causes movement of the paddle relative to the container resulting in the consistency of the contents of the container being tested at infrequent intervals. As the incubation of the milk and yogurt starter continues in the warmed environment, a point will be reached where the mixture begins to rapidly gel. Under the gelled condition, the paddle and non-circular container will become locked against rotation and this thereby causes the occluding means to which the motors are affixed to rotate about the paddle support shaft from a vent hole occluding position to a vent hole open position. The rotation of the occluding means in the manner described also causes an electrical switch to open, shutting off power to the motor and to the heating element. With the power off and the vent hole(s) open, cool air from the refrigerator will quickly absorb the heat energy within the appliance, terminating the fermentation process.

The container is preferably designed to have a square periphery around its open upper end and around its inner peripheral side walls and the cover member is also square.

As such, the cover may be placed atop the container in any one of four positions. It has been found convenient to place a plurality of electrical switch actuators atop the wall of the container and surrounding the opening therein and then provide mating electrical switch contacts on the cover member such that when the cover is placed on the container in a first of the four possible positions, it causes the appliance to operate in a mode to produce yogurt. When the cover is rotated 90° and placed atop the container, only switches for causing the appliance to operate in a mode for producing soft frozen yogurt or ice cream will be actuated. Similarly, another 90° rotation of the cover relative to the container will result in only those switches for causing the appliance to produce hard frozen yogurt will be actuated. The fourth possible position of the square cover relative to the square base will cause only those switches to be actuated whereby the appliance can be used to produce Ricotta cheese. The cover and container are appropriately color-coded or otherwise marked to facilitate selection of a desired operating mode.

When the appliance of the present invention is to be used in preparing frozen yogurt or ice cream, the cover is placed on the container's open top in a different orientation such that cooperating switch and switch actuating devices on the container and cover disconnect the heating element from its source of power. A previously chilled freezing bowl dimensioned to fit into the opening in the container is removed from the refrigerator's freezer compartment and inserted into the opening of the container. The previously prepared mix is then poured into the freezing bowl, as the drive motors are permitted to continuously drive either rotatable drive shaft and paddle or the container such that the frozen yogurt mix forming on the cylindrical inner wall of the freezing bowl is continuously scraped therefrom. The relative rotation of the container with respect to the paddle continues until the resistance on the paddle due to the presence of the hard or soft frozen yogurt overcomes predetermined retaining forces to again allow the occluding means to rotate to the position wherein the electrical switch for applying power to the motor is opened.

When the appliance of the present invention is to be used in making agglutinated yogurt curd (Ricotta cheese), provision is made for nearly continuous rotation of the paddle in a warmed yogurt mix, stopped only about every 15 minutes for not more than a brief pause lasting approximately five seconds. A yogurt culture, which is stirred continuously, agglutinates and forms a curd which may settle as a firm mass sticking to the bottom of the irregular shaped container or it may attach to and shrink on the stirring paddle, forming a ball. When the paddle increasingly becomes mired in the bottom and which is attached to the irregular shaped container, it causes a force resisting movement of the paddle. When the paddle, with its attached curd-ball, abruptly re-accelerates from a stop to a turning movement, the inertia of the curd ball on the paddle similarly causes a transient force sufficient to overcome the predetermined force between the occluding means and the cover so that the device opens up the vent holes in the cover and turns off the motor and timer.

DESCRIPTION OF THE PREFERRED EMBODIMENT

Figure 1:
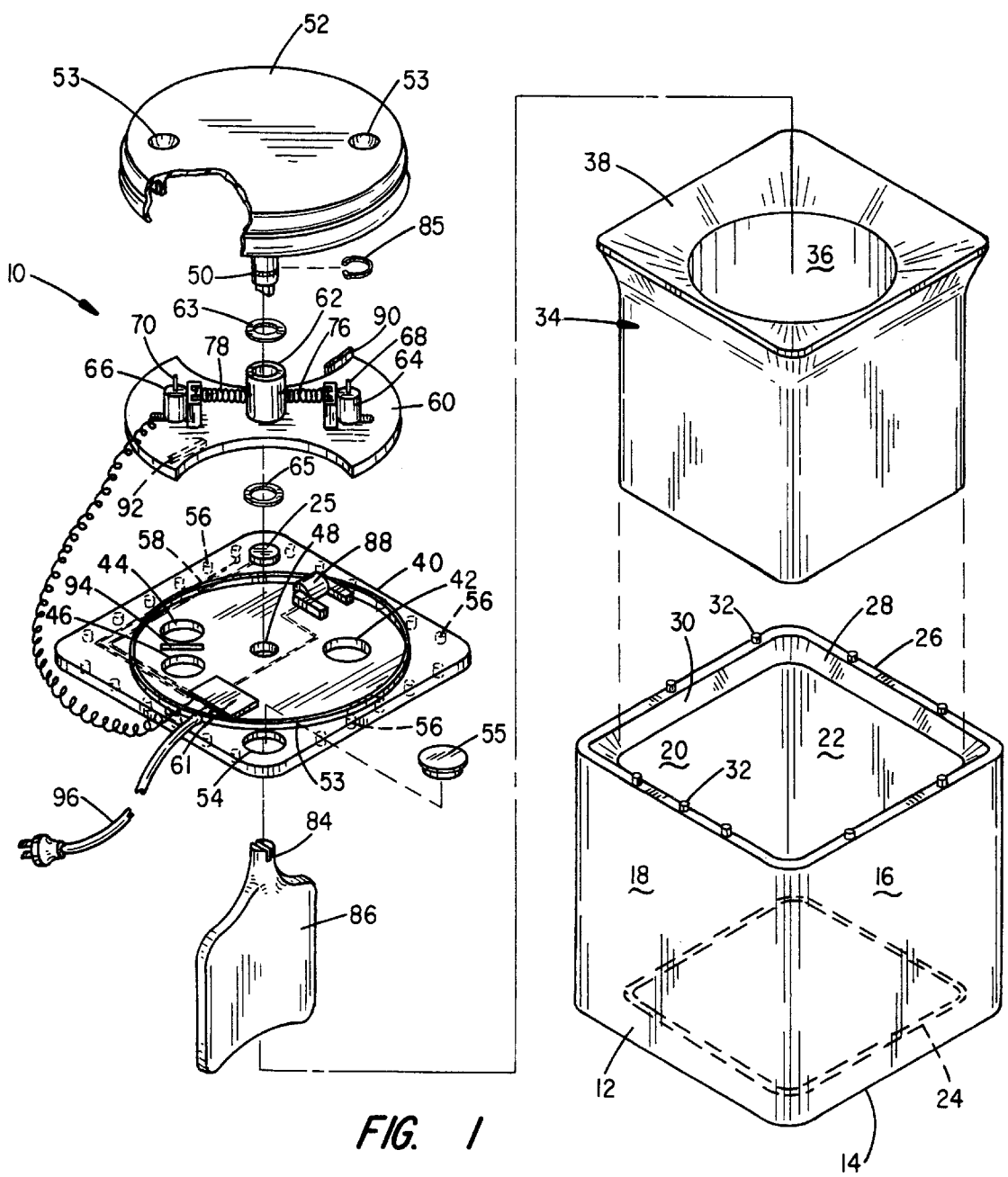
FIG. 1 is an exploded view of the home yogurt/cheese making machine of the present invention.

Referring first to FIG. 1, there is indicated generally by numeral 10 a home appliance useful in preparing yogurt, soft or hard frozen yogurt or ice cream, and cheese from a starter and either bottled milk or a mixture of dried milk and water as well as other ingredients for providing a desired taste and consistency.

The machine is seen to comprise a base container 12 of generally square configuration defined by a bottom 14 and four mutually perpendicular side walls 16, 18, 20 and 22. The container 12 will preferably be molded from a suitable plastic and incorporated into the walls 16, 18, 20 and 22 and/or the bottom 14 is a thermostatically controlled heating element 24, here shown as an elongated coil or serpentine arrangement of a nicrome wire that is arranged to warm the interior and, therefore, the contents of the container. Other heating element arrangements may also be embedded within the walls of the container or the paddle. The thermostat control is identified by numeral 25 in the drawings. The four walls 16–22 define an open upper top 26 having downwardly and inwardly sloping edges as at 28 and 30. The mutually perpendicular side walls 16–22 and/or the bottom 14 are preferably formed of materials and insulation so that the heat energy derived by passing electrical current through the heating element 24 will be inwardly directed. The upper edges of the four side walls include a plurality of post-like protuberances, as at 32, which are spaced or otherwise distributed at predetermined intervals and, as will be further explained, function as electrical switch actuators.

Disposed above the base container 12 in the exploded view of FIG. 1 is an optional freezing bowl 34 that is used when preparing such products as hard or soft frozen yogurt or ice cream. The freezing bowl, which is also of a rectangular outer shape, is dimensioned to be insertable into the base container 12. The freezing bowl 34 has a substantially cylindrical inner wall 36, preferably formed from aluminum or microwave heatable stainless steel. The inner wall may have a non-stick coating, such as Teflon, thereon to facilitate release of frozen product therefrom. Disposed between the cylindrical inner wall 36 and the rectangular outer wall and nearly filling it is a chemical mixture exhibiting a low freezing point, a relatively high latent heat of fusion and a low coefficient of expansion. This material when first frozen is capable of absorbing heat from the container contents over a reasonable period sufficient to cause the contents to freeze. The double-walled freezing bowl 34 has an inwardly and downwardly sloping surface 38 leading to the cylindrical chamber 36. Prior to use, the insert 34 is adapted to be placed in the freezing compartment of a household refrigerator and chilled until the chemical material contained between the walls becomes frozen.

Sized to fit atop the rim of the base container 12 is a cover member 40, preferably fabricated from a suitable plastic and having a plurality of vent openings 42, 44 and 46 formed through the thickness dimension thereof. A further central opening 48 is also provided for receiving the shaft 50 of a motor-driven drive member 52 therethrough. The rectangular cover 40 further includes an additional opening 54 through which liquid ingredients may be poured into the freezing bowl 34 when the cover is in place thereon. The opening 54 is vertically aligned with the sloped upper edges of the freezing chamber so that when material is poured through the opening 54, it will flow into the container. An integrally molded, upwardly projecting annular wall 53 on cover 40 is designed to cooperate with the downwardly depending rim on drive member 52 to act as a baffle against inadvertent spillage when pouring ingredients into opening 54. A snap-in removable cap 55 is used to seal the opening 54.

Positioned about the periphery of the cover 40 on the lower surface thereof are a plurality of cavities comprising normally opened switch contacts, as at 56, and which are positioned so as to cooperate with the switch actuating pins 32 on the upper edge of the base or container 12. The switch contacts 56 may comprise conventional diaphragm-type switches, each comprising first and second layers of metallization that are spaced apart from one another by an apertured insulating strip. One of the layers of metallization is deposited on a plastic (Mylar) membrane that when deformed through the aperture in the spacer layer, engages the second layer of metallization. Thus, when the cover 40 is assembled atop the base or container 12, only those diaphragm switches 56 which are aligned with a switch actuator 32 will have their contacts closed. The switch contacts are adapted to be connected, via printed or other wiring 58, to a control circuit 61 also mounted on the cover 40. Rather than utilizing diaphragm switches, the switch actuators 32 themselves may be metal covered and function as a first electrical contact designed to cooperate with second contacts formed in recesses on the undersurface of the over 40.

Figure 2:
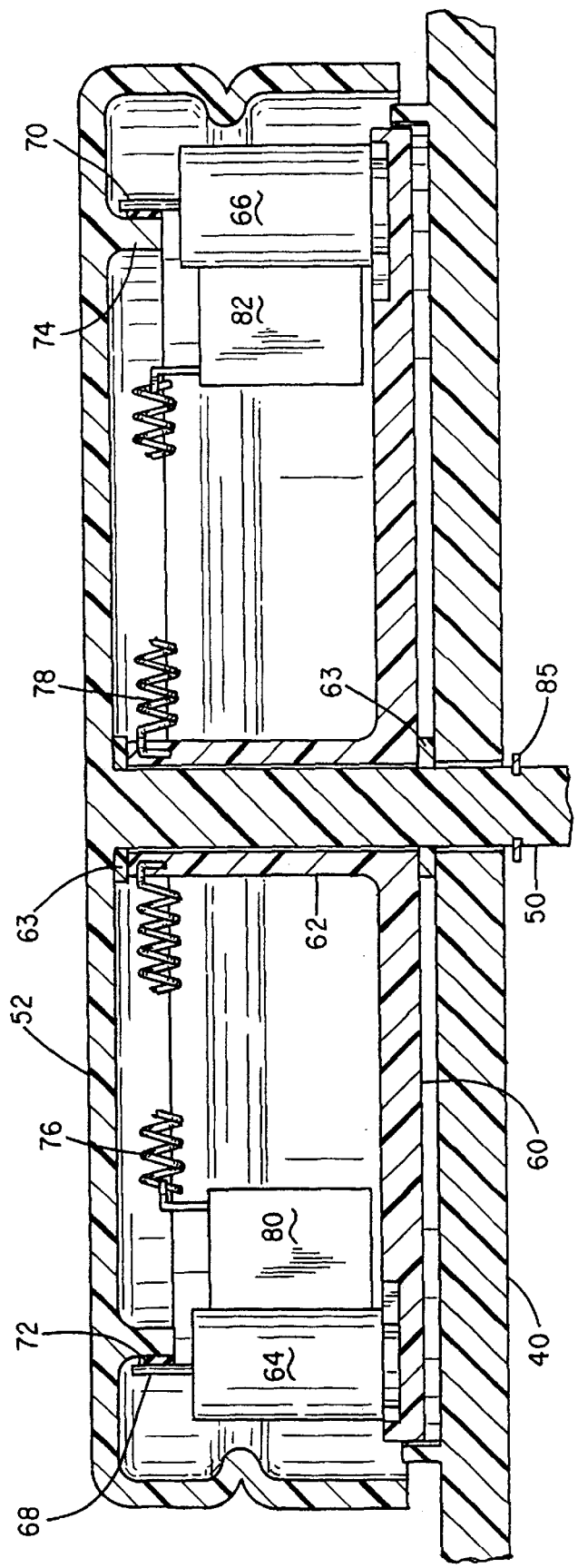
FIG. 2 is a partial cross-sectional view of the apparatus of FIG. 1.

Disposed atop the cover 40 and loosely surrounding the shaft 50 of the drive member 52 is an occluder 60 having an integrally formed sleeve bearing 62 centrally disposed thereon. Washer-type spacers 63 and 65 fit over shaft 50 on opposite ends of the sleeve bearing 62 to prevent frictional engagement between the occluder 60 and cover 40 and drive member 52. A pair of electrical drive motors 64 and 66 are mounted on the occluder 60. As best seen in the enlarged view of FIG. 2, the motor 64 and the motor 66 are slide mounted on the occluder 60 and have shafts 68 and 70, respectively, frictionally engaging an elastomeric band 72 deployed about an annular projection 74 that extends downwardly from the undersurface of the drive member 52.

Tension springs 76 and 78 are operatively coupled via the magnetic cores 80 and 82 of the motors 64 and 66 as well as to the sleeve bearing 62 of the occluder 60. The springs function to maintain the motor shafts 68 and 70 in firm engagement with the elastomeric friction band 72 surrounding the annular projection 74 to inhibit slippage of the motor shafts on the friction band. A C-clip 85 holds the drive member, occluder and cover together as a unit.

The paddle support shaft 50 is adapted to be coupled to a stub shaft 84 on a paddle member 86 by a C-clip 85. During use, the paddle is disposed within the container 12 and adapted to be driven by the drive shaft 50 when the motors 64 and 66 are simultaneously energized. Alternatively, the motors may be arranged to rotate the container relative to a paddle that remains stationary. The machine of the present invention may also be constructed so that the heating element may be contained in the paddle rather than the walls of container 12 with slip-ring contacts for coupling electrical power thereto.

The control circuit 61 disposed on the cover 40 is also wired to an electromagnet 88 having first and second coils of differing numbers of turns such that three different magnitudes of magnetic attractive force can be applied for respectively causing a relatively moderate magnetic attraction to a weak permanent magnet 90 on the occluder 60 or, alternatively, two selectively greater attractive forces. Reciprocally, the permanent magnet 90 can apply a weak attractive force to the core of the inactive electromagnet 88.

The occluder 60 is arranged to shift between first and second positions. In the first position, the occluder 60 blocks the vent holes 42, 44 and 46 and in its second position uncovers those holes to expose the contents of the machine within the container 12 to the cooling temperature of a refrigerator in which the machine is placed during use. When in the first position, a permanent magnet embedded in the occluder member 60 and identified by numeral 92 cooperates with a magnetic reed switch 94 disposed on the cover 40 to maintain the reed switch 94 closed. When the occluder 60 is made to shift to its second position, the reed switch 94 is no longer under the influence of the permanent magnet 92 and its contacts open.

Figure 3:
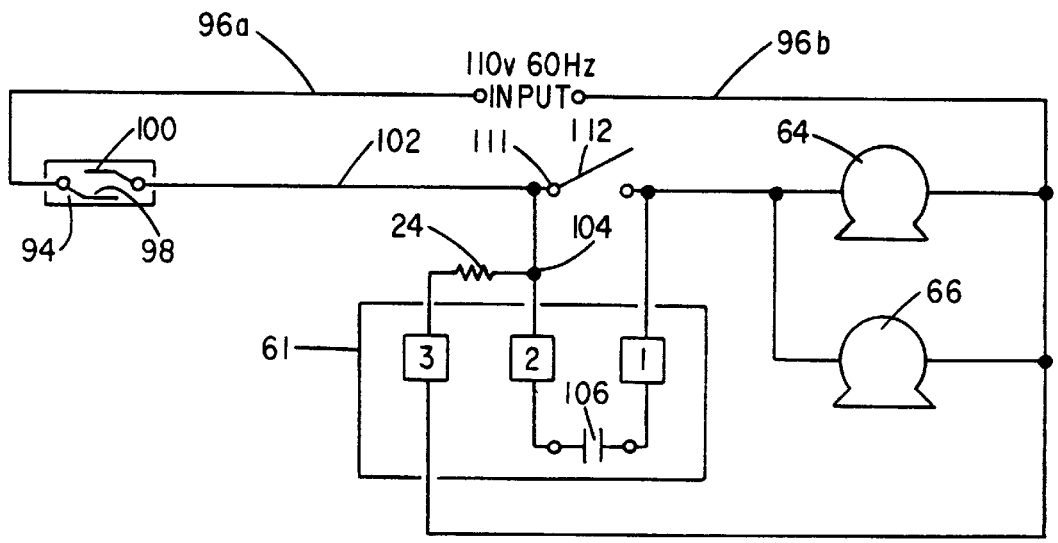
FIG. 3 is a schematic diagram of the electrical controls of the basic machine when used only for preparing yogurt or cheese.

Referring now to the circuit diagram of FIG. 3, there is shown a circuit arrangement that may be used if the machine is only to be used in making yogurt or cheese. A power cord 96 has its input prongs adapted to be connected to a source of household current. A first insulated conductor in the power cord 96a connects to a first normally open contact 98 of the magnetic reed switch 94 and its second contact 100 is connected by a conductor 102 to a junction point 104 to which one side of the heating element 24 is attached. The second conductor of the power cord 96b is connected through terminal point 3 within the control module 61 to the remaining terminal of the heating element 24. The junction 104 is also connected to terminal point 2 within the controller module. The drive motors 64 and 66 are connected in parallel between the conductor 96b and a terminal point 1 in the controller module. A set of normally open timer operated contacts 106 are connected in series between terminal points 1 and 2. While mechanical switch contacts 106 are depicted in the drawings, the controller 61 will typically be a solid state device that will be biased to either a conducting or non-conducting state.

In use for preparing non-frozen yogurt, a yogurt starter and either previously boiled liquid milk or dry, powdered milk plus water, is poured into the container 12 and the assembly, including the paddle 86, the drive member 52, the occluder 60 and the rectangular cover 40 are placed, as a unit, atop the container 12 and the drive member 52 is manually rotated in the counterclockwise direction (when viewed as in FIG. 1) by placing a finger in the recess 53 formed in the exposed upper surface of drive member 52 to thereby rotate the occluder 60 to its initial position blocking the vent openings 42, 44 and 46 formed through the cover 40. The assembly will then be placed within a refrigerator with the power cord 96 extending through the flexible rubber seal of the refrigerator door and then plugged into a wall outlet. With the occluder 60 in the position to occlude the openings 42, 44 and 46, the permanent magnet 92 embedded in the occluder will cause the contacts of the normally open reed switch 94 to be closed. As such, current will flow through the heating element 24 to begin to warm the milk/starter mix within the container 12. At this time, permanent magnet 90 is attracted to the iron of the unenergized electromagnet 88 with a relatively weak force.

At relatively infrequent intervals, the timer control 61 will cause the contacts 106 to also close for a relatively short interval. Without limitation, the contacts 106 may close about every 15 minutes for a time interval of about five seconds. When the contacts 106 close, an electrical current is supplied not only to the heater 24, but also to the motors 64 and 66.

Upon energization of the motors 64 and 66, and assuming a stationary container 12, the drive member 52 will be rotated in the clockwise direction to also rotate the paddle 86 within the liquid mixture to thereby test the consistency of the constituents. After a few hours, the yogurt mixture will convert from a liquid to a somewhat firm gel. This transition occurs relatively rapidly.

Now, the next time that the timer contacts 106 are made to close, the motors 64 and 66 will attempt to rotate the drive member 52 and the paddle 86 which are keyed to one another. Because of the rectangular shape of the container 12, the paddle 86 will not only be unable to rotate within the gel but will also be unable to twirl the gelled yogurt and, as a result, the motors affixed to the occluder 60 will overcome the relatively weak magnetic force provided by magnet 90 and will cause the occluder 60 to rotate so as to uncover the vent openings 42, 44 and 46 and simultaneously cause the contacts 98, 100 of the magnetic reed switch 94 to open. Opening of the contacts 98 and 100 disconnects both the heating element 24 and the controller/timer 61 from the power source and thereby shuts off the motors 64 and 66.

Exposure of the gelled yogurt in the container 12 to the cool air within the refrigerator, via the vent openings 42, 44 and 46, will allow the contents to cool rather rapidly, thereby terminating the incubation process at a time when the consistency and flavor are optimum.

In making cheese, the controller by-pass switch 111 is closed so that the motors 64 and 66 run continuously and the heating element 24 is also energized. Also, the unit need not be set in a refrigerator as increased acidity could be desired and abrupt termination of incubation may not be required. When the milk has been warmed and continuously agitated, after a period of time, the curds agglutinate and become a solid mass. At this point, the cheese mass will inhibit rotation of the paddle 86. This causes the motors to now rotate the occluder, opening the reed switch 94 and disconnecting power from the motors and heating element. Alternatively, by-pass switch 111 may be left open and timer/control 61 programmed to cause contacts 106 to open for a relatively short interval. The contacts 106 may open, for example, about every 15 minutes for a time interval of about five seconds. When the paddle, either with its attached curd-ball or within a firm or semi-firm mass, reaccelerates, the inertial or resistance force is sufficient to overcome the predetermined weak force between the occluding means and the cover so that the device opens up the vent holes in the cover and turns off the motor and the timer and the heating element.

The operation thus far described involves the making of regular yogurt and cheese. By configuring the circuit as in the diagram of FIG. 4, additional capability is provided to the apparatus of FIG. 1. Specifically, it can be used to prepare not only yogurt and cheese, but also soft and hard frozen yogurt or ice cream.

When it is desired to make soft frozen yogurt, the optional insert 34 is utilized. The freezing bowl 34 will have been thoroughly chilled in a freezer or in the freezing compartment of the refrigerator before it is placed into the base container 12. Previously prepared frozen yogurt mix is then poured into the cylindrical cavity of the quick freeze insert 34, via access port 54 formed in the cover 40. Also, the cover 40 will be installed on the base container 12 in a different orientation than when the machine is being used to create yogurt in the first instance. As will be explained, the repositioning of the cover 40 relative to the base container 12 will result in different modes of operation.

Figure 4:
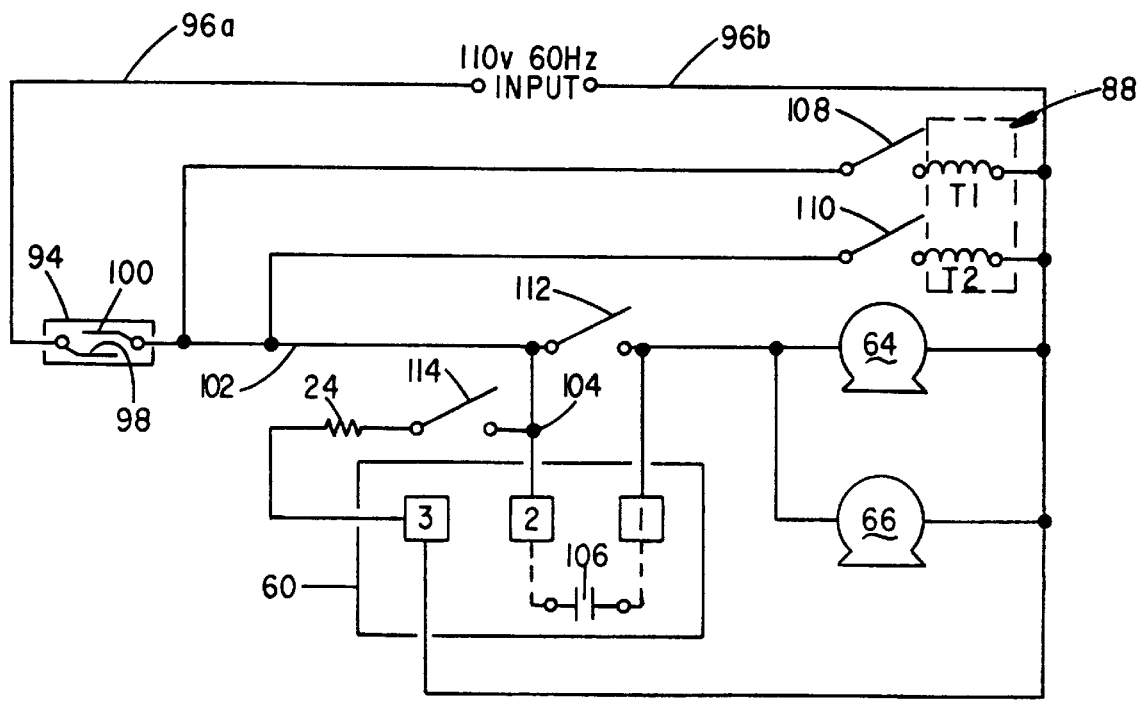
FIG. 4 is a schematic diagram of the electrical circuitry incorporated in the machine for selectively preparing one of yogurt, hard and soft frozen yogurt or ice cream and cheese products.

FIG. 4 is a schematic electrical diagram of the apparatus of the present invention when designed for additional or multiple use application. In this arrangement, the electromagnet 88 is represented by two coils labeled $T_1$ and $T_2$. The coils $T_1$ and $T_2$ are adapted to be connected between the conductor 102 and the AC supply line 96b when switches 108 and 110 are closed. In addition, a bypass switch 112 is provided which effectively removes the timer control 60 from the circuit when it is closed.

The electromagnet 88 has fewer turns on coil $T_1$ than it does on coil $T_2$ and, as a result, the electromagnet 88 provides a lesser restraining force to the occluder 60 when the switch 108 is closed than is afforded when switch 110 providing energization to the coil $T_2$, is closed.

It is to be further noted that a single pole, single throw normally open switch 114 is connected in series with the heating element 24 between terminal 3 of the timer control 60 and junction point 104.

The open/closed state of the switches 108, 110, 112 and 114 is determined by the orientation of the cover 40 relative to the top of the container 12. When making regular yogurt, the switch actuator pins 32 will cooperate with the cover such that switch contacts 108, 110 and 112 remain open while contact 114 is closed. However, when making soft, frozen yogurt, the cover will be positioned such that the switch actuators 32 will cooperate with the switches 108, 110, 112 and 114 so that contacts of switch 108 will be closed, 110 will be open, 112 will be closed and 114 will be open. As such, motors 64 and 66 will operate continuously. With switch 114 open, no current will flow through the heating element 24. As the paddle is continuously driven within the cylindrical chamber 36 of the freezing bowl 34, as the yogurt freezes on the walls of the chamber 36, it will be scraped off by the continuously rotating paddle 86 and will be mixed with the still somewhat liquid frozen yogurt mix remaining in the chamber. Of course, it is also possible to provide the desired scraping action by rotating the container 12 relative to a stationary paddle disposed in the cylindrical chamber.

Once the consistency of the soft frozen yogurt becomes sufficiently stiff to overcome the attractive force due to current flowing through the coil $T_1$, the occluder 60 will again rotate due to the stalled condition of the paddle 86. The occluder will again reposition so as to open the reed switch contacts 98 and 100 to disconnect the motors 64 and 66 and to remove current from the coil $T_1$. While not shown, it is also contemplated that the machine of the present invention be provided with an audible signaling device which would sound so that the soft frozen yogurt can be removed from the freezing bowl 34 before the yogurt becomes more firm due to the freezing action of the insert.

When using the machine of the present invention to produce hard frozen yogurt or ice cream, the freezing bowl 34 is again used, but the cover will now be repositioned on the base container 12 such that the switch actuators 32 cooperate with the switches 56 on the cover 40 to cause switches 110 and 112 to be closed and switches 108 and 114 to be open or switches 108 and 110 may both be closed. Also, the machine of the present invention may be inserted into the refrigerator's freezer compartment. Given the fact that the coil $T_2$ of the electromagnet 88 has a greater number of turns than the coil $T_1$ which is active in making soft frozen yogurt, the cover 40 and the occluder 60 will be attracted to one another with an increased force. With switch 114 open, the heating element 24 is not energized. Also, because switch 112 is closed, the timer circuit 60 is no longer functional and the motors 64 and 66 will run continuously until such time as the magnetic reed switch 94 opens. As heat energy is removed from the yogurt mixture within the cylindrical compartment 36 of the freezing bowl 34 by the chemical contained between the walls of the insert and by the action of the refrigerator's freezing compartment, the yogurt will become more and more firm until a point is reached wherein the scraper paddle 86, in attempting to scrape and stir the freezing yogurt, will overcome the force exerted by the coil $T_2$ of the electromagnet and the motors will then drive the occluder 60 on which they are mounted so as to cause the magnetic reed switch contacts 98 and 100 to open and thereby disconnect the motors and the coil $T_2$ from the power lines.

Removal of the frozen product from the bowl 34 may be facilitated by briefly placing the bowl and its frozen contents into a microwave oven and heating it for a short time sufficient to melt the bond of the yogurt to the wall of the bowl. As mentioned, a Teflon coating or a plastic liner in the bowl is an alternative solution.

When the machine of the present invention is to be used in making ricotta cheese, the freezing bowl is not used and the motors 64 and 66 run continuously or with a duty cycle in which they remain on for a relatively long interval and off for a short interval. The heating element will remain energized and the weak magnet 90 will provide the attractive force between the cover 40 and the occluder 60. Stated otherwise, the cover 40 will be positioned on the container such that the switch actuators 32 on the container will cooperate with the switches 56 to cause switch 108 to be open, 110 to be open, 112 to be open, 106 to be open or closed and 114 to be closed. The machine may be placed within a refrigerator but this is not necessary. The milk and starter will be placed in the container 12 and the occluder positioned so as to occlude the openings 42, 44 and 46 in the cover and to cause the magnetic reed switch 94 to be closed. Because the mixture is being warmed and continuously stirred by the paddle over prolonged periods of time, a point will be reached wherein the mixture begins to flocculate agglutinate and form into a rather firm curdled mass on the bottom of the container. Also, the mass may tend to aggregate or form on the paddle itself. When this process is complete to the point where this mass inhibits rotation of the paddle or an attempt to restart the paddle movement following a brief interruption in its rotation by opening of the timer switch 106, the increased inertia or resistance caused by the cheese mass on the paddle or the container will be enough to overcome the attractive force afforded by the permanent magnet 90 and will result in the occluder 60 shifting in position due to the action of the motors to the point where the magnetic reed switch 94 again opens to thereby disconnect the heating element 24 and the motors 64 and 66 from the household power source.

While there has been shown and described an exemplary embodiment of the present invention, others skilled in the art will readily appreciate that various changes and modifications may be made to the apparatus illustrated. For example, rather than using a friction drive between the motor shafts and the elastomeric band on the drive member, an arrangement of gears driven by a single motor may be used instead. The motor may be disposed in a base located below the container, if the container is designed to include a center vertical sleeve and bearing for allowing a shaft to pass through it to the occluder associated with the cover. Further, and as is mentioned in the foregoing specification, the heating element may be located in the paddle member rather than in the walls of the container 12. This would afford the additional advantage of allowing the paddle to be extracted from hard frozen yogurt or ice cream by heating the paddle for a short interval to melt the ice cream at its interface with the paddle. Any of a variety of electrical slip ring contacts can be used to provide electrical energy to a heating element in a rotating member. Another modification would be to sense changes in the current drawn by the motors as the consistency of the product varies from a liquid to a gel or to a solid and use that sensed current change to control the movement of the occluder and to shut off the current to the heating element and to the drive motor(s). A safety switch might be incorporated which would shut down all possibility of current flow whenever the cover is removed and, also, a reduced voltage may be utilized for all functions to avoid electrical shock to the user. It is also contemplated that the appliance of the present invention can be modified to permit bread making and other food processing in addition to the other function described herein.

The above description is thus intended by way of example only and is not intended to limit the present invention in any way except as set forth in the following claims.

What is claimed is:

1. A machine for selectively making yogurt, soft frozen yogurt, soft ice cream, hard frozen yogurt, hard ice cream and cheese comprising:

(a) a container having a flat base and peripheral side walls defining a non-circular open top;

(b) a cover member configured to fit atop the peripheral side walls in covering relation to the open top, said cover member including at least one vent hole formed therethrough and an aperture adapted to receive a drive shaft therethrough;

(c) a downwardly depending drive shaft of a length sufficient to pass through the center hole of the cover member;

(d) a paddle secured to a lower end of the drive shaft beneath the cover member for rotation within the container and adapted to stir and test the contents, at least one of the base, peripheral side walls and paddle having an electrical heating element associated therewith and adapted to apply heat to the container contents when energized;

(e) means disposed about the drive shaft for selectively occluding and opening said at least one vent hole;

(f) means operatively coupling the occluding means to the cover member with predetermined forces; and (g) motor means disposed on the occluding means for normally rotating the drive shaft and paddle and which rotates the occluding means from said at least one vent hole occluding position to an open position when thickening of the contents in the container inhibits rotation of the paddle with a resistance force exceeding the predetermined forces.

2. The machine as in claim 1 and further including an electrical switch for disconnecting electrical power from the heating element and the motor means upon rotation of the occluding means to the open position.

3. The machine as in either claim 1 or claim 2 and further including electrical timer means for applying electrical power to the motor means with a predetermined duty cycle.

4. The machine as in claim 3 wherein the duty cycle is such that the motor means is energized for a relatively short time interval measured in seconds at periods measured in a fraction of an hour when the machine is being used to make yogurt.

5. The machine as in claim 4 wherein the fraction is in a range of from 1/12 to about 3/4.

6. The machine as in claim 5 wherein the fraction is ¼.

7. The machine as in claim 4 wherein the short time interval is in a range of from about one to ten seconds.

8. The machine as in claim 3 wherein the duty cycle is such that the motor means is continuously energized for a relatively long time interval measured in fractions of an hour and periodically deenergized for a relatively short time interval measured in seconds when the machine is making cheese.

9. The machine as in claim 8 wherein the fraction is in a range of from 1/12 to about ¾.

10. The machine as in claim 9 wherein the fraction is ¼.

11. The machine as in claim 8 wherein the short time interval is in a range of from about one to ten seconds.

12. The machine of claim 1 wherein the means operatively coupling the occluding means to the cover member is a magnetic or mechanical device.

13. The machine of claim 2 wherein the electrical switch is magnetically actuated.

14. The machine of claim 1 wherein the container is formed from a thermally insulating material.

15. The machine of claim 1 and further including a generally circular drive member secured to the drive shaft and overlaying the occluding means, the motor means being mounted on the occluding means and having a motor shaft coupled in driving relation to the circular drive member.

16. The machine of claim 15 wherein the circular drive member includes an annular concentric wall projecting downward from an undersurface thereof, the annular wall being covered by a rubber-like material that is engaged by the motor shaft.

17. The machine as in claim 16 wherein the motor shaft is spring-biased against the rubber-like material.

18. The machine as in claim 1 wherein the non-circular open top is generally square and includes a plurality of switch actuators positioned along four peripheral side walls of the container defining the square opening.

19. The machine as in claim 18 wherein the cover member is rectangular and includes a plurality of switch devices positioned thereon for cooperating with the plurality of switch actuators on the container and configured such that placement of the cover member onto the top of the container activates selected ones of the switch devices.

20. The machine as in claim 19 wherein placement of the cover member on the container in four different orientations operatively programs the switching devices for producing any one of yogurt, soft frozen yogurt, hard frozen yogurt and cheese, respectively.

21. The machine as in claim 18 and further including a double walled freezing bowl having a generally square outer wall and a cylindrical inner wall, the outer wall dimensioned to fit within the container, and a medium having a relatively high heat of fusion and a relatively low melting point partially filling a volume between the outer wall and the inner wall.

22. The machine as in claim 21 wherein the inner wall is coated with a non-stick material.

* * * * *